United States Patent [19]

Itoh

[11] 4,317,019
[45] Feb. 23, 1982

[54] METHOD AND APPARATUS FOR ELECTRICALLY CUTTING WORK PIECES WITH A WIRE ELECTRODE

[75] Inventor: Teturoh Itoh, Nagoya, Japan

[73] Assignee: Mitsubishi Denki Kabushiki Kaisha, Tokyo, Japan

[21] Appl. No.: 71,416

[22] Filed: Aug. 30, 1979

[51] Int. Cl.³ ............................................... B23P 1/02
[52] U.S. Cl. ............................. 219/69 M; 204/129.1; 219/69 D; 219/69 W
[58] Field of Search ............. 219/69 D, 69 M, 69 W; 204/129.1, 129.5, 129.6, 129.7, 129.75

[56] References Cited

U.S. PATENT DOCUMENTS

| | | | |
|---|---|---|---|
| 3,417,006 | 12/1968 | Inoue | 204/129.75 |
| 3,440,156 | 4/1969 | Dickson | 204/129.5 |
| 3,731,044 | 5/1973 | Ullmann et al. | 219/69 W |

FOREIGN PATENT DOCUMENTS 2851482 5/1979 Fed. Rep. of Germany ....................... 204/129.75

*Primary Examiner*—C. C. Shaw
*Attorney, Agent, or Firm*—Sughrue, Mion, Zinn, Macpeak & Seas

[57] ABSTRACT

A method of electrically cutting a work piece with a wire electrode in which while electric current is applied between the work piece and the wire electrode through a cutting liquid in a cutting gap formed therebetween. The work piece and the wire electrode are relatively moved to each other, to cut the work piece into an article having a desired configuration. The specific resistance of the cutting liquid is controlled to control the width of a groove cut in the work piece. Furthermore, an apparatus for practicing the method is disclosed, which comprises a cutting liquid mixing and supplying device for controlling the specific resistance of the cutting liquid to a desired value and supplying into a cutting gap.

7 Claims, 5 Drawing Figures

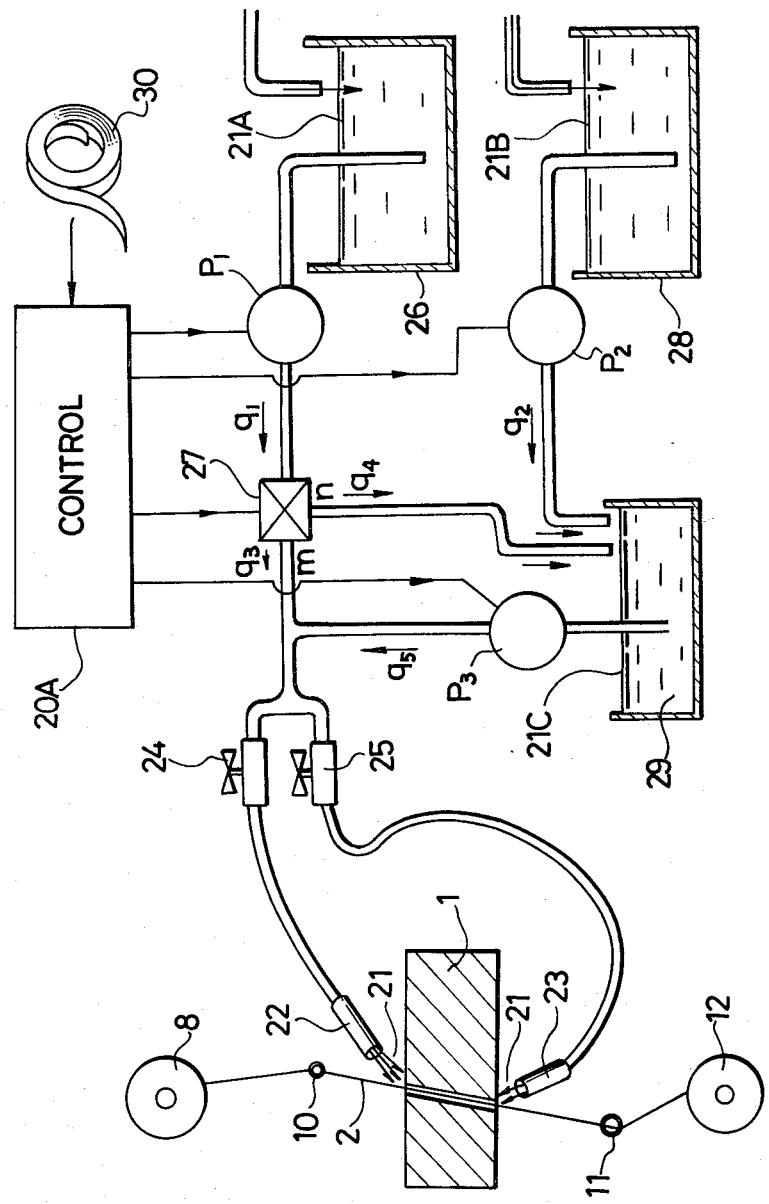
F I G. 5

METHOD AND APPARATUS FOR ELECTRICALLY CUTTING WORK PIECES WITH A WIRE ELECTRODE

BACKGROUND OF THE INVENTION

This invention relates to a method of electrically cutting a work piece with a wire electrode in which a work piece is electrically cut with a wire electrode in a manner similar to that of cutting with a fret saw, while an electric current is fed between the wire electrode and the work piece through a cutting liquid in a cutting gap. The invention provides a novel method especially effective in improving the aforementioned method and an apparatus for practicing the same.

FIG. 1 is an explanatory diagram for a description of the operation of a conventional apparatus for practicing a method of taper-cutting a work piece by electrical discharge.

The apparatus, as shown in FIG. 1, comprises, a table 3 on which a work piece 1 to be cut is placed; the table 3 being moved in X and Y directions respectively by an X-axis drive motor 4 and a Y-axis drive motor 5. A wire electrode 2 is supplied from a wire supplying reel 7, and then wound on a wire winding reel 12 passing through a tension roller 8, a current supplying section 9, an upper wire guide 10 and a lower wire guide 11 in the stated order.

The apparatus of FIG. 1 further comprises an x-axis drive motor 14 and a y-axis drive motor 15 adapted to drive the wire guide 10 respectively in x and y directions in order to incline the wire electrode 2 at a desired angle in a desired direction.

A cutting liquid is supplied from a cutting liquid supplying device (not shown) into a cutting gap formed between the wire electrode 2 and the work piece 1 during the cutting operation. A cutting electric power is supplied from a power source 16. A discharge circuit, which is made up of a DC power source 17, a charge current limiting resistor 18 and a capacitor 19 is usually employed as the power source 16.

A control device 20 is provided to control the X-axis drive motor 4 and the Y-axis drive motor 5 adapted to drive the table 3 in the X-Y direction, and the x-axis drive motor 14 and the y-axis drive motor 15 adapted to drive the upper wire guide 10 in the x-y direction. These motors are used to move the work piece 1 relative to the wire electrode 2 so that the work piece 1 is cut into a desired configuration. The control device 20 is made up of a profiling control device, an N/C control device or a computer.

FIG. 2 shows a work piece being subjected to taper-cutting by the apparatus of FIG. 1 to produce a die. In FIG. 2, reference character 1A designates the die which is obtained by cutting the work piece 1. The periphery of the lower opening of the die 1A forms the cutting edge. The area of the upper opening of the die is larger, as defined by a value r, than the lower opening, so that the inner surface has a relief taper in the finished condition.

If the thickness of the work piece 1 is represented by t, then the taper angle, i.e. the inclination angle $\theta$ of the wire electrode 2 is:

$$\theta = \tan^{-1}(r/t) \qquad (1)$$

Accordingly, in forming the die 1A, it is necessary at all times to incline the wire electrode 2 outwardly by the angle $\theta$ in a plane perpendicular to the cutting surface of the work piece. In other words, it is necessary to drive the upper wire guide 10 in the x-y direction by controlling the x-axis drive motor 14 and the y-axis drive motor 15 so that the wire electrode 2 is maintained inclined by the angle $\theta$ in a direction perpendicular to the cutting line.

The wire electrode 2 must be inclined as stated above at all times. When the cutting operation is carried out along the straight line of the die 1A, it is unnecessary to change the inclination direction of the wire electrode 2. However, when the cutting operation is carried out along corners or curves, it is necessary to change the inclination direction of the wire electrode in such a manner that the inclination direction coincides with a direction perpendicular to the cutting lines. This is accomplished by driving the wire guide 10 in the x-y direction according to the advancement of the cutting operation.

That is, in the case of FIG. 2, the inclination direction of the wire electrode 2 must be changed according to the advancement of the cutting operation. While the cutting locus is advanced from the point b to the point c on the lower surface of the work piece 1, it must advance from the point B to the point C on the upper surface of the work piece 1.

FIG. 3 is an enlarged view showing the movement of the wire electrode 2 with respect to the work piece 1, which is effected when the cutting operation is carried out along the curve. The work piece 1 is cut by moving the wire electrode 2 along the surface of a circular cone with the vertex a.

If, in this case, the curvature radius of the locus of the wire electrode 2 which moves from the point b to the point c on the lower surface of the work piece 1 is represented by Rd, then the curvature radius Ru of the locus of the wire electrode 2 which is moved from the point B to the point C on the upper surface of the work piece 1 is:

$$Ru = Rd + r = Rd + t \cdot \tan\theta \qquad (2)$$

Accordingly, the cutting distance per unit time of the upper surface of the work piece 1 is different from that of the lower surface: that is, the cutting speed of the upper surface is different from that of the lower surface.

In electric discharge machining (EDM) with the aid of the wire electrode, the amount of material cut away from the work piece by the application of current is a function of the cutting time. Therefore, if the cutting speed is different, the width of the cut groove becomes different.

FIG. 4 is a plan view showing the cutting operation along the curve. As is apparent from FIG. 4, on the upper surface of the work piece 1, curve cutting is carried out at a speed equal to substantially the maximum speed which is employed for linear cutting. Accordingly, the width of the groove cut along the curve from the point B to the point C is equal to the width of the groove cut along the straight line up to the point B, as shown by solid line in FIG. 4.

On the other hand, on the lower surface of the work piece 1, the curve cutting speed is lower than the straight line cutting speed and the width of the cut groove is increased. Accordingly, the width of the groove cut along the curve from the point b to the point c is larger than the width of the groove cut along the straight line up to the point b, as shown by dotted line in FIG. 4. That is, the dimensional accuracy of the curve on the lower surface of the work piece becomes lower than the accuracy for the upper curve.

As described above, in forming a die 1A, the cutting edge thereof which is formed by the lower surface of the work piece 1 and must be of highest accuracy, becomes in fact low in dimensional accuracy. This is a fatal drawback and makes it difficult to practice the method of taper-cutting a work piece by electric discharge.

SUMMARY OF THE INVENTION

Accordingly, an object of this invention is to eliminate all of the above-described difficulties of the prior art.

The invention has been developed on the realization that the width of a groove cut in a work piece depends on the specific resistance of a cutting liquid applied to a cutting gap between the work piece and the wire electrode. The invention is intended to control the width of the groove cut in the work piece with the wire electrode by controlling the specific resistance of the cutting liquid applied to the cutting gap.

Heretofore, an apparatus for electrically cutting a work piece with a wire electrode could not effectively be utilized for cutting a work piece into a tapered article such as a trimming die, because the dimensional accuracy in cutting a work piece along a curve is low. However, if a method of cutting a work piece with a wire electrode according to the invention is applied to the conventional apparatus, then the width of a groove cut in the work piece can be controlled as desired. Accordingly, the cutting edge of a die, for instance, can be formed with high accuracy.

That is, heretofore in manufacturing a tapered article such as a trimming die having a relief taper by using an apparatus for EDM or electrochemical machining (ECM), it has been absolutely necessary to use a mold electrode whose configuration is just opposite to the configuration of the manufactured article. However, now such an article can be manufactured by EDM or ECM with a wire electrode, without using such a mold electrode, because the width of a groove cut in the work piece can be controlled as desired by employing the control method of the invention.

Thus, according to the invention, the range of application of the apparatus for electrically cutting a work piece with a wire electrode, which is economical, is increased, and furthermore the finish accuracy of an article manufactured by the apparatus is improved. Thus, the invention contributes greatly to the improvement in economy and quality of manufactured articles.

This invention will be described in greater detail with respect to the drawings and the description of the preferred embodiment that follows.

BRIEF DESCRIPTION OF THE DRAWINGS

FIG. 5 is a schematic diagram, showing the arrangement of one example of a cutting liquid supplying device for practicing a method of electrically cutting a work piece with a wire electrode according to this invention.

DESCRIPTION OF THE PREFERRED EMBODIMENT

Figure 1:
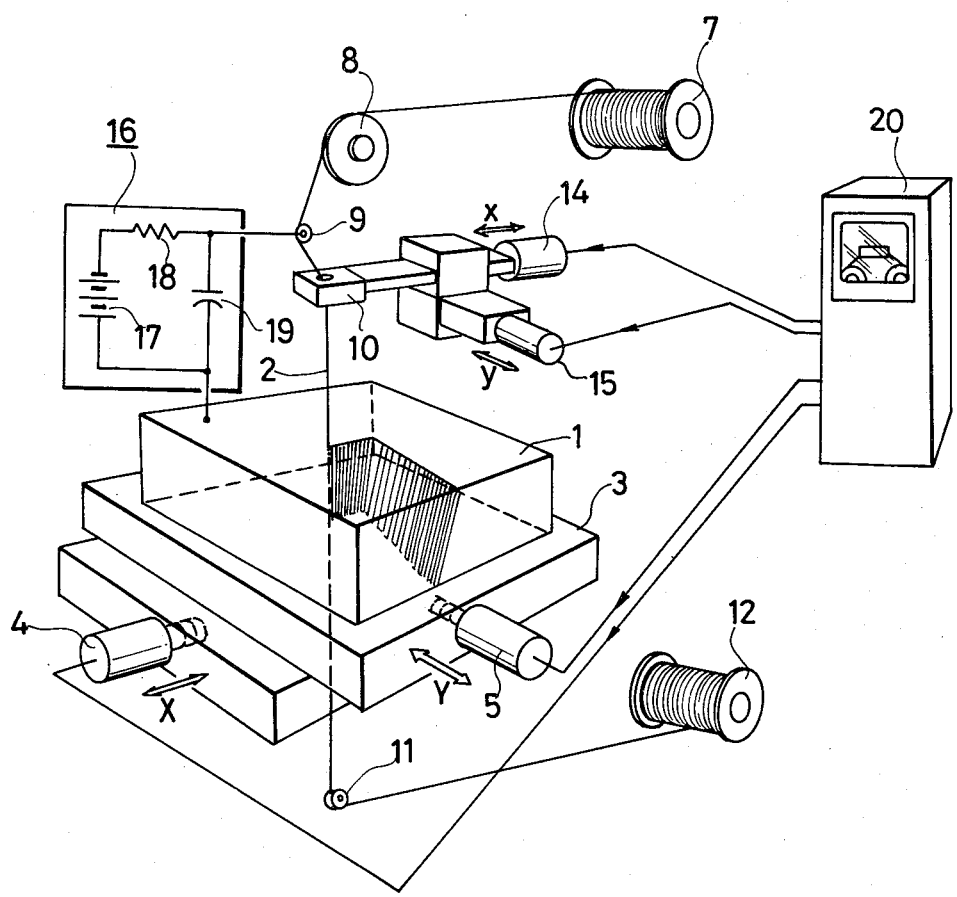
FIG. 1 is an explanatory diagram for a description of the operation of one example of a conventional apparatus for taper-cutting a work piece with a wire electrode with the aid of electric discharge.

FIG. 5 shows a preferred embodiment of a cutting liquid supplying device for practicing a method of cutting a work piece with a wire electrode with the aid of electric discharge according to this invention.

In a conventional apparatus for taper-cutting a work piece by electric discharge, the same cutting liquid is supplied to a cutting gap between a wire electrode and a work piece. In this invention, the apparatus shown in FIG. 5 is used to supply a cutting liquid while controlling the specific resistance thereof to a desired value as required for a particular operation.

In FIG. 5, reference numeral 21 designates a cutting liquid supplied to a cutting gap between a wire electrode 2 and a work piece 1 to be cut. Elements 22 and 23 are an upper nozzle and a lower nozzle which are adapted to jet the cutting liquid 21 to the cutting gap from above and below the work piece, respectively. Valves 24 and 25 are used for controlling the amounts of cutting liquid 21 ejected by the upper and lower nozzles 22 and 23, respectively.

Referring further to FIG. 5, reference numeral 21A designates a cutting liquid whose specific resistance is relatively low, the cutting liquid 21A being the one which is used in the ordinary method of cutting a work piece with a wire electrode. It has a specific resistance in the order of 50 K$\Omega$·cm. 21B designates a cutting liquid whose specific resistance is relatively high, the cutting liquid 21B being, in general, pure water. Storage tanks 26 and 28 store the liquids 21A and 21B, respectively. A cutting liquid 21C is obtained by mixing the two liquids 21A and 21B so as to attain a desired specific resistance. Element 29 is a storage tank for storing the liquid 21C. A two-way control valve 27 controls the direction of supply of the cutting liquid 21A. P1, P2 and P3 designate pumps for supplying, under pressure, the liquids 21A, 21B and 21C from the storage tanks 26, 28 and 29, respectively.

A control device 20A is operatively connected to the above-described components to operate as follows. In response to an instruction from an N/C tape 30, the control device 20A controls the pumps P1, P2 and P3 and the two-way control valve 27. In general, the control device 20A is such that the control function of the above-described cutting liquid supplying device is given to the control device 20 (FIG. 1) adapted to control the body of the apparatus for taper-cutting a work piece by electric discharge. Such control devices are well known in this technology for mixing by valve control. Hence, the mixing ratio of the liquids 21A and 21B is controlled to supply the liquid 21 having a desired specific resistance to the cutting gap for the work piece 1.

The cutting operation of the apparatus for tapercutting a work piece by electric discharge provided with the cutting liquid supplying device capable of controlling the specific resistance of the cutting liquid 21C as shown in FIG. 5 will now be described. In the case of the cutting operation in which the cutting speed for the upper surface of the work piece 1 is equal to that for the lower surface as in straight line cutting, the pump P1 is operated and the two-way control valve 27 is opened so that the liquid in the storage tank 26 is run in the direction m. In this case, only the cutting liquid 21A, low in specific resistance, is supplied to the cutting gap to cut the work piece 1.

In the cutting operation in which the cutting speed for the upper surface of the work piece 1 is different from that for the lower surface, such as in circular cone cutting, the two-way control valve 27 is opened so that the liquid is run in the direction n, and the pumps p1 and p2 are operated. The flow rate q1 of the cutting liquid 21A, low in specific resistance, and the flow rate q2 of the cutting liquid 21B, high in specific resistance, are adjusted to provide a desired mixing ratio of the two liquids. Accordingly, in this case, the cutting liquid 21C is prepared by mixing the two liquids so that it has a desired specific resistance and is stored in the storage tank 29. The liquid 21C thus stored is supplied by the pump P3 to the cutting gap to cut the work piece 1. In this case, the width of the groove cut along the curve on the lower surface of the work piece 1 can be made substantially equal to the width of the groove cut along the straight line. Furthermore, the width of the groove cut along the curve on the upper surface of the work piece 1 can be made smaller than the width of the groove cut along the straight line of the work piece.

As is apparent from the above description, in order that the width of the groove cut for a section of the work piece 1 where the dimensional accuracy must be high, is uniform throughout the cutting operation, the specific resistance of the cutting liquid 21C is controlled by the cutting liquid supplying device as shown in FIG. 5. The cutting liquid 21C thus controlled is supplied to the cutting gap to control the width of the cut groove.

Figure 2:
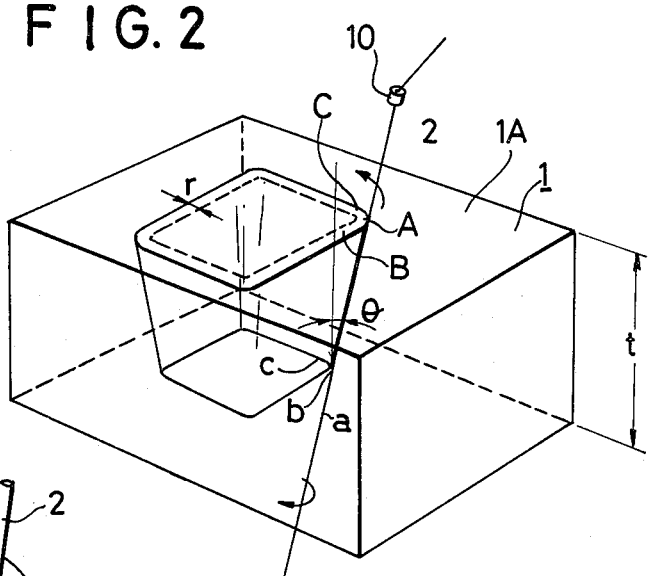
FIG. 2 is a perspective view of a work piece which is being cut by the apparatus shown in FIG. 1.
Figure 3:
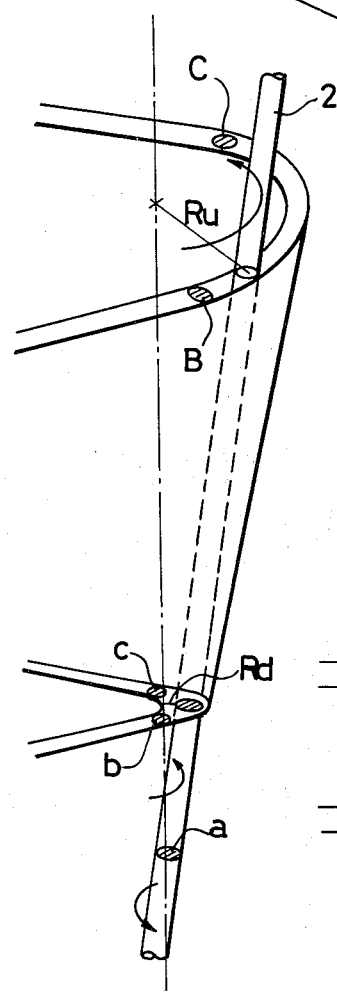
FIG. 3 is an enlarged perspective view of the essential parts of the work piece being cut.
Figure 4:
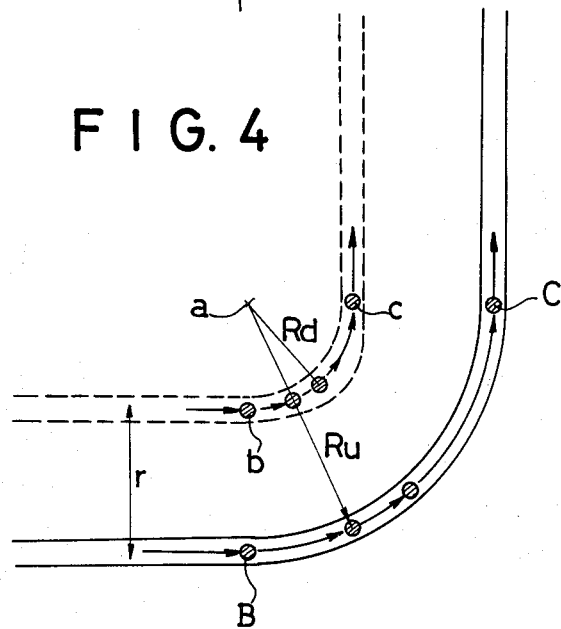
FIG. 4 is a plan view of the essential parts shown in FIG. 3.

For instance, in manufacturing a die 1A as shown in FIG. 2, the groove width is controlled so that the width of the groove cut along the curve on the lower surface of the work piece 1, which becomes the cutting edge of the die 1A, is equal to the width of the groove cut along the straight line. As a result, the die 1A having a high accuracy cutting edge can be obtained.

In this case, the width of the groove cut along the curve on the upper surface of the work piece 1 is smaller than the width of the groove cut along the straight line. Accordingly, in the case of manufacturing a die 1A as described above, the dimensional accuracy for the upper surface thereof is somewhat low. However, this will cause no problem in practical use. Thus, according to the invention, an article such as a die 1A whose essential parts must be high in accuracy can be readily manufactured in accordance with the method of taper-cutting a work piece by electric discharge.

In the work piece cut in the above-described method, the width of the groove cut along the curve on the upper surface thereof is smaller, and the dimensional error is larger. However, it should be noted that the part still has a marginal portion which can be machined later, so that the dimensional error can be corrected, when necessary.

The invention has been described with reference to the case in which the method according to the invention is utilized to improve the cutting accuracy of the method of taper-cutting a work piece by electric discharge. However, the invention may also be applied to the case where it is required to control the width of a groove cut during the cutting operation carried out in accordance with the method of cutting a work piece with a wire electrode with the aid of electric discharge.

For instance, the method according to the invention is exceptionally effective in controlling width of a groove cut in a work piece made of two layers of different materials, such a silver and tungsten, copper and tungsten, or graphite and steel.

The method of the invention may additionally be applied to a method of the ECM with a wire electrode, in which current is applied to the wire electrode and a work piece with the electrolyte interposed therebetween to cut the work piece by utilizing the electrolysis action as well as the method of cutting a work piece with a wire electrode with the aid of electric discharge.

In the former method of ECM, the amount of cutting of the work piece is the function of the period of time electric current is applied to the cutting gap. Accordingly, for instance in the case of manufacturing an article as shown in FIG. 2 in accordance with the method of taper-cutting a work piece by ECM with a wire electrode, the width of a groove cut along a curve on the lower surface of the work piece 1 is increased. Accordingly, the dimensional accuracy is low. However, this difficulty can be eliminated by employing the method of the invention in which the specific resistance of the electrolyte is controlled thereby to control the width of a groove cut in the work piece.

That is, the invention is effective in controlling the width of a groove cut during the cutting operation. The method of cutting a work piece includes EDM and ECM methods in which electric current is applied through a cutting liquid to a cutting gap between the wire electrode and the work piece, and in which the amount of cutting is a function of the period of time during which the electric current is applied.

As is apparent from the above description, the invention makes it possible to control the width of groove cut in a work piece as required during the electrically cutting operation by controlling the specific resistance of a cutting liquid provided in the cutting gap formed by the wire electrode and the work piece.

What is claimed is:

1. In a method of electrically cutting a work piece with a wire electrode, said work piece being electrically cut by applying electric current through a cutting liquid in a cutting gap formed by said wire electrode and said work piece, said wire electrode and work piece being moved relative to each other to cut said work piece into an article having a desired configuration, the improvement comprising the step of: during said cutting, controllably changing the specific resistance of said cutting liquid supplied to said cutting gap during a taper portion of cut, as compared to a non-taper portion, said change in the specific resistance being effected in response to signals from a controller.

2. A method as claimed in claim 1, wherein the width of said groove cut in said work piece is controlled by using as a reference value the required dimensional accuracy at a predetermined part of said article obtained by cutting said work piece.

3. A method as claimed in claims 1 and 2, wherein said method of electrically cutting is electrical discharge machining method.

4. A method as claimed in claims 1 and 2, wherein said method of electrically cutting is electrochemical machining method.

5. In an apparatus for electrically cutting a work piece with a wire electrode, said work piece being electrically cut by applying electric current through a cutting liquid in a cutting gap formed by said wire electrode and work piece, said wire electrode and work piece being moved relatively to each other, the improvement comprising; means for controllably changing the specific resistance of the cutting liquid supplied to said cutting gap during a taper portion of cut, as compared to a non-taper portion.

6. The apparatus of claim 5, wherein said means for controllably changing the specific resistance comprises a cutting liquid supplying device including a nozzle for supplying a cutting liquid to said cutting gap; a first storage tank for storing a first cutting liquid whose specific resistance is relatively low; a second storage tank for storing a second cutting liquid whose specific resistance is relatively high; a third storage tank for storing a third cutting liquid, said third cutting liquid being prepared by mixing said first and second cutting liquids so that the specific resistance of said third cutting liquid is adjusted to a desired value; and a control means for suppling said first cutting liquid through said nozzles to said cutting gap when a cutting speed on one surface of said work piece is equal to that on the opposite surface thereof, and for mixing said first and second cutting liquids to prepare said third cutting liquid having a desired specific resistance, and for supplying said third cutting liquid thus prepared to said cutting gap through said nozzles when a cutting speed on one surface of said work piece is different from that on the opposite surface thereof.

7. An apparatus as claimed in claim 6, wherein said apparatus is employed to cut said work piece into a tapered article, and said control means supplies said first cutting liquid through said nozzle to said cutting gap when the cutting operation is carried out along a straight line on said work piece, and supplies said third cutting liquid through said nozzle to said cutting gap when the cutting operation is carried out along a surface of a circular cone on said work piece.

* * * * *